May 6, 1952  W. A. YONKERS  2,595,623
SIGNAL GENERATOR
Filed Feb. 28, 1950  2 SHEETS—SHEET 1
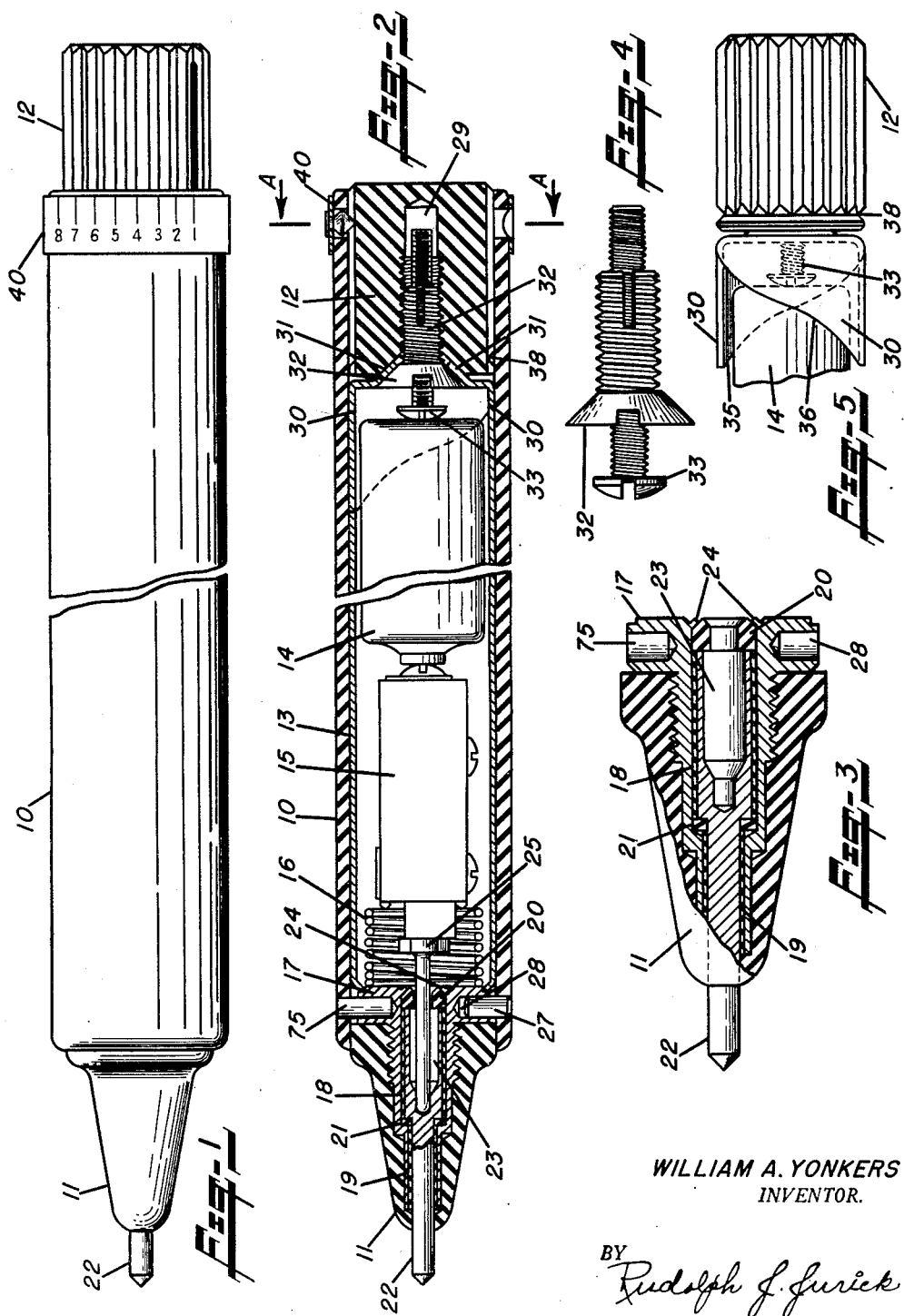
WILLIAM A. YONKERS
INVENTOR.
BY Rudolph J. Jurick
ATTORNEY May 6, 1952     W. A. YONKERS     2,595,623
SIGNAL GENERATOR
Filed Feb. 28, 1950     2 SHEETS—SHEET 2
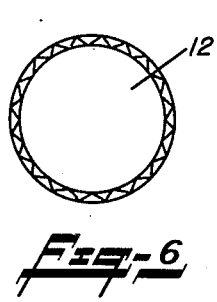
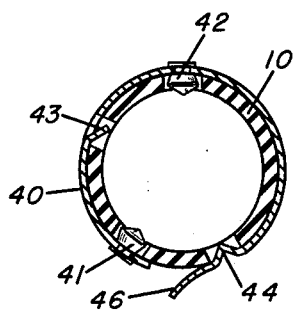
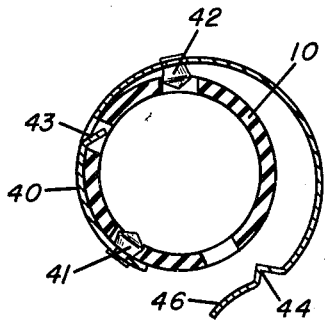
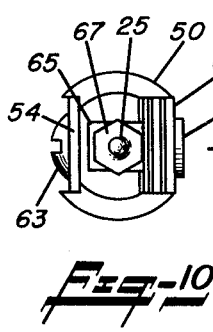
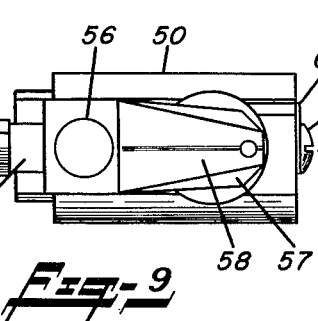
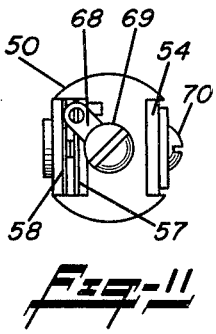
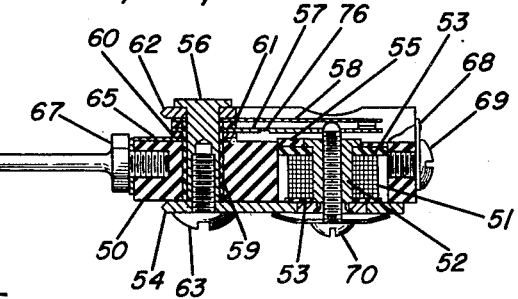
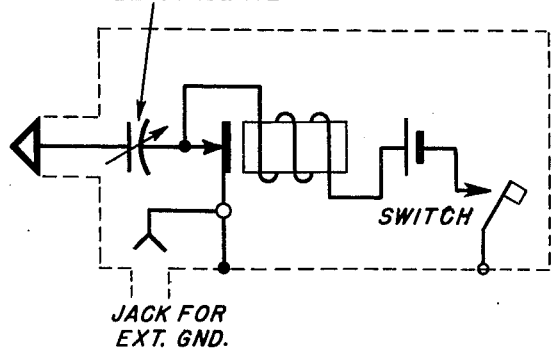
WILLIAM A. YONKERS
INVENTOR.
BY Rudolph J. Jurick
ATTORNEY Patented May 6, 1952

2,595,623

UNITED STATES PATENT OFFICE 2,595,623

SIGNAL GENERATOR

William A. Yonkers, Mountain Lakes, N. J., assignor to Radio Frequency Laboratories, Inc., Boonton, N. J., a corporation of New Jersey Application February 28, 1950, Serial No. 146,790

17 Claims. (Cl. 175—183)

This invention relates to an electronic circuit tester and more particularly to a portable, self-contained signal generator useful for energizing electrical circuits for signal tracing purposes.

A signal generator made in accordance with this invention comprises an aperiodic impulse generator, or buzzer, and a source of electrical energy, such as a small flash-light battery, housed in a handy, tubular, probe-type casing. Adjustable control means are provided whereby the inductive voltage peaks appearing across the buzzer contacts can be impressed upon a test prod either directly or through capacitive coupling, the latter being selectively variable in discrete steps. The vibration frequency of the buzzer is approximately 1000 cycles per second and the inductive voltage wave appearing across the contacts includes harmonics that extend into the radio frequency spectrum.

The device may be used to generate a signal for testing tuned circuits or, alternatively, the device will provide an audio voltage of approximately one (1) volt for direct continuity tests. In general, devices of this type are used to supply an input voltage signal to the circuit under test while observing the effect upon the output voltage. When the signal generator voltage, having a sharp wave front, is applied to a tuned R. F. circuit, the circuit will transmit the voltage component having a frequency that corresponds, approximately, to the resonant frequency of the circuit. Therefore, the signal generator constitutes a convenient source of R. F. energy for testing such circuits.

An object of this invention is to provide an improved construction for signal generators affording a maximum flexibility and facility of use, freedom from failure of the operating parts, and ease of replacing normally expendable components or parts.

An object of this invention is the provision of a portable, self-contained signal generator including means for selectively varying the electrical coupling between the signal source and the external means for impressing the signal upon a circuit to be tested.

An object of this invention is the provision of a portable signal generator comprising a tubular housing carrying a battery, circuit interrupter, externally-extending test prod, and common means for opening and closing a circuit between the battery and interrupter and for selectively varying the strength of the signal available at the test prod.

An object of this invention is the provision of an improved electrical interrupter of the electromagnetic type wherein the interrupter is of small size adapted for insertion into a probe-type, tubular housing and including means for decreasing the contact breaking time whereby such contacts will have a long operating life.

An object of this invention is the provision of a probe-type, self-contained signal generator comprising a tubular housing, a head carrying a test prod removably secured to one end of the housing, an axially movable push-button extending from the other end of the housing, a pair of cooperating, metallic tubes one of which is fixed with respect to the housing and the other movable with the said push-button, a buzzer and battery disposed within at least one of said metallic tubes, means including the tubes and the button for closing an electrical circuit between the battery and the buzzer, a metal tip electrically and mechanically connected to the said buzzer and means selectively operable to alter the electrical coupling between the said metal tip and the said test prod.

These and other objects and advantages will become apparent from the following description when taken with the accompanying drawings which illustrate a commercial form of the invention. The drawings are intended for purposes of illustration and are not to be construed as defining the scope or limits of the invention, reference being had for this purpose to the appended claims.

In the drawings wherein like reference characters denote like parts in the several views:

Figure 1 is an elevation view of a signal generator made in accordance with this invention;

Figure 2 is a central, cross-sectional view taken longitudinally through the Figure 1 device, but showing the push-button depressed to complete the electrical circuit between the battery and the electromechanical current interrupter;

Figure 3 is an enlarged view of the removable head with surfaces broken away to show the assembly of the various parts carried by the said head;

Figure 4 is an enlarged view showing the construction of the battery position adjusting screw and the flat-head screw that enters a threaded bore in the push-button;

Figure 5 is an elevation view of the push-button and short tube carried thereby;

Figure 6 is an end view of the push-button illustrating the longitudinally-extending flutes;

Figure 7 is a transverse, cross-sectional view taken along the line A—A of Figure 2;

Figure 8 is similar to Figure 7 but showing one end of the index ring pried outwardly with respect to the housing;

Figure 9 is a plan view of the electromagnetic current interrupter, or buzzer;

Figure 10 is an end view showing the front of the buzzer;

Figure 11 is an end view showing the back of the buzzer;

Figure 12 is a central, cross-sectional view taken along the line B—B of Figure 9; and Figure 13 is a simplified, schematic circuit diagram of the device.

Referring to Figures 1 and 2, a device made in accordance with this invention comprises a tubular, probe type housing 10 made of plastic or other insulating material of convenient size to fit the hand. Extending from one end of the housing is a tapered head 11 that is removably attached to the housing by means which will be described in detail hereinbelow. A push button 12 extends from the other end of the housing and is slidable therein in response to finger pressure exerted thereon. Disposed within the housing is a metal shell 13 that fits snugly against the housing wall said tube surrounding a battery 14, a buzzer 15 and a helical spring 16. It may here be stated that these parts are arranged so that depression of the button 12 closes an electrical circuit between the battery and the buzzer.

As shown more clearly in Figure 3, the head 11 is threaded upon the shank of a metal plug 17, the latter having an axial bore of two different diameters extending therethrough for the accommodation of the two insulating sleeves 18, 19 and the two insulating washers 20, 21. The metal prod 22 has a pointed tip external of the head 11 and an axial bore 23 in the opposite end. By crimping over the material in the base of the plug 17, to form ledges 24 that reduce the bore opening at this point, the threading of the plug into the head will secure all the parts firmly and in proper position with respect to each other. It will be apparent the plug 17 is electrically insulated from the prod 22. The washer 20 permits entrance of the tip 25 (see Fig. 2) into the bore of the prod, said tip being connected mechanically and electrically to the buzzer, as will be described below. The assembled head is fastened to the housing 10 by a force-fitted pin 27 passing through a hole in the housing wall and into a radial bore 28 in the base of the plug 17. When so assembled the spiral spring 16 and the edge of the metallic shell 13 will make contact with the base of the plug 17, it being noted that the spring 16 tends to expand and move the buzzer, battery and button 12 away from the plug 17. Inasmuch as the tip 25 is attached to the buzzer the spring tension will, normally, keep the tip 25 well spaced from the bottom of the bore 23 in the prod 22. Thus, the normal "off" position of the button 12 is as shown in Figure 1 whereas Figure 2 illustrates the relative position of the parts when the button is fully depressed and in which position the tip 25 contacts the prod 22.

The button 12 provides a unique on-off switch for controlling energization of the buzzer and, at the same time, affords a simple means for selectively varying the coupling between the tip 25 and the externally-extending prod 22. The inner face of the button includes a countersunk section terminating in a partially threaded bore 29. A relatively short metal tube or shell 30 has a "dished-out" end conforming to the countersunk section in the button whereby the two parts may be fastened together by a flat-head screw 32 that is threaded into the bore 29. This screw has a slotted end and includes an internal thread passing completely through the screw, said internal thread being adapted to receive the screw 33, as shown in Figure 4. Such construction assures a tight fit between the flat-head screw 32 and the bore threads on the one hand, and the co-acting threads of the two screws 32, 33, on the other. Thus, the tube 30 remains securely fastened to the button 12 and the screw 33 may be threaded into and out of the screw 32 without affecting such attachment between the tube and button.

As shown in Figure 5, the shell 30 is rather short and has opposed, triangular-shaped sections cut into the free end resulting in two, divergently-extending, diagonally-sloped edges 35, 36. It will be noted that the battery 14 fits within the "fins" defining the side walls of the shell and the base of the battery rests against the screw 33. It will be apparent that adjustment of the screw 33 affords a simple means for setting the extent to which the battery protrudes for the tube 30. Such adjustment is desirable to compensate for variations in the overall length of commercial batteries.

Referring again to Figure 2, the adjacent end of the long shell 13 is cut to provide divergently-extending edges complimentary to the edges of the short shell 30. Thus, by rotating the button 12 the adjacent edges of the shells may be meshed, or dove-tailed, together to form a substantially continuous, closed tube. By rotating the button 90 angular degrees the adjacent edges of the two shells will be out of the intermeshing alinement and only the forward tips of each shell will contact each other. The extent to which the button can be depressed into the housing determines the extent to which the tip 25, carried by the buzzer, extends into the bore 23 within the prod 22. Thus, if the adjacent edges of the two shells 13, 30 are alined for complete inter-meshing, the tip 25, upon depression of the button, will contact the prod 22. On the other hand, if the adjacent edges of the two shells are out of inter-meshing alinement the tip 25 will extend only partially into the bore of the prod. By providing means for a step-by-step rotation of the button the degree to which the tip 25 will protrude into the bore of the prod 22 upon depression of the button (and, consequently, the electrical coupling between the tip and prod) may be selected by the user to meet particular requirements encountered in the use of the device.

As shown in Figures 5 and 6, the circumferential surface of the button 12 is flutted resulting in longitudinal ridges and grooves that terminate in a circumferential groove 38. The maximum outside diameter of the button is such that the button will fit freely, but snugly, within the tubular housing. The longitudinal flutes and the circumferential groove, in combination with properly placed rivets extending into the tubular housing form the means for preselecting the degree of electrical coupling between the tip 25 and the prod 22. The rivets for this purpose are carried by an index ring 40 that is removably attached to one end of the tubular housing.

As shown in Figure 7, the index ring 40 has rivets 41, 42 secured thereto and a pair of detents 43, 44 formed therein, each rivet and detent being associated with a suitable aperture in the wall of the housing 10. The detents are formed by breaking the surface of the ring as is well-known in the art. When the ring is placed around the housing the detent 43 is pressed further into the associated aperture to anchor the ring to the housing so that the ring will remain attached to the housing during normal use of the device. It will be noted that the rivets 41, 42 normally extend beyond the inner wall of the housing and inasmuch as the button diameter is just slightly less than the inside diameter of the housing it is necessary to move the rivets radially outward of the housing to insert the button into the housing. This is accomplished as follows. By prying outwardly upon the flared end 46 of the index ring, the ring can be spread outward of the housing, as shown in Figure 8, thereby raising the rivet 42 so that its tip lies within the confine of housing wall. This leaves only the rivet 41 protruding into the housing cavity. However, the index ring has sufficient resiliency (between the section defined by the rivet 41 and the anchoring detent 43) so that the rivet 41 may be forced outwardly as the tube 30 (carried by the button 12) is forced into the end of the housing. When the button is inserted to the point where the circumferential groove 38 lies opposite the rivet 41, the ring tension will cause said rivet to snap into the groove, after which the other end of the ring may be released and the detent 44 pressed into its aperture. Both of the rivets now ride in the circumferential groove 38 and there is provided sufficient tension at two, spaced points in the groove, to prevent a prying out of the button. The arcuate spacing between the rivets 41, 42 is such that with the push-button in place each of the rivets is alinable, individually, with a longitudinal flute in the surface of the button. Consequently, although the button cannot be removed from the housing while the index ring is in the normal position, the button may be rotated to aline distinct flutes with the tips of the rivets whereupon the button may be pressed inward, as desired. It will be apparent that when the button is depressed into the housing the rivets 41, 42 will slide along the longitudinal flutes and, therefore, the button cannot be rotated.

By placing a fiducial mark on the push-button, as by white paint in one of the flutes, and providing a scale of reference indicia on the index ring 40 (Figure 1) I provide means for selectively setting and indicating the relative electrical coupling between the tip 25 carried by the buzzer and the prod 22. Thus, for example, with the marked flute alined with the scale mark No. 1 the adjacent edges of the metal shells 13, 30 will be so alined that they will mesh perfectly permitting maximum movement of the button into the housing. Under this condition the battery and buzzer will be subject to maximum axial displacement whereby the tip 25 will contact the prod 22. Upon release of the finger pressure applied to the button the helical spring 16 forces the buzzer, battery and button in a reverse direction until the rivets 41, 42 fall into the circumferential groove 38. In this "normal" or "off" position of the push button the edges of the shells 13, 30 will be separated and such separation of the shells opens the electrical circuit, as will be explained in more detail hereinbelow. The button may now be rotated to aline the marked flute with another of the scale markings on the index ring, for example, the mark No. 10. This changes the relative axial position of the diagonal edges of the short shell 30 with respect to the like edges of the long shell 13 such that the leading tips of the diagonal edges are in alinement. Under this condition the button 12 can be depressed only the minimum distance, that is, until contact is made between the leading edges of the two shells. Physical contact between the metal shells closes the electrical circuit to the buzzer but the relatively small movement of the button results in only a small axial displacement of the battery and buzzer. Thus, the tip 25 will extend into the prod 22 only a minimum distance and the electrical coupling between these two members will be the minimum value. Intermediate settings of the button relative to the scale markings provide intermediate degrees of electrical coupling between the tip 25 (that is connected electrically to the buzzer), and the test prod 22.

The construction of the electromagnetic current interrupter, or buzzer, is illustrated in Figures 9 to 12. The body 50, made of plastic or other suitable material, has arcuate side walls and a width somewhat less than the inside diameter of the metal shell 13 (Figure 2) so that the buzzer will slide freely within the shell. The energizing coil 51 comprises a winding of insulated wire wound over a soft-iron, threaded core 52 and between end flanges 53, said coil being located within a circular hole in the base 50 and secured therein by the soft-iron plate 54 and the flush mounted washer 55. The H-shaped body 50 results in two longitudinal troughs on opposite sides of the body which troughs serve to locate the various parts required to make the buzzer. A metal stud 56 provides a mounting for the two contact arms 57, 58 which are insulated from each other by the insulating tube 59 and the insulating washer 61. It will be noted the stud has a head formed on one end that abuts against a metal plate 62 whereby the screw 63 secures the entire assembly of stud, contact arms and washers to the base 50. The washers and the contact arms, in the region of the stud, have a width such that they fit nicely within the troughs whereby they cannot rotate out of proper alinement. Each of the contact arms carries a contact point. These points make and break the electrical circuit to the energizing coil and, therefore, are made of silver, platinum-iridium, or other material commonly accepted as satisfactory for such use. The metal tip 25 is threadedly secured to one end of the base 50 and is provided with a hexagonal shoulder 67 that clamps a metal contact plate 65 against the base. The plate 65 extends upwardly over the edge of the base and the stud 56 passes through a hole therein. Electrical contact between this plate and the lower contact arm 57 is made through the washer 60.

One end of the coil winding is soldered to a terminal 68 that is secured to the other end of the base 50 by the screw 69. The other end of the coil winding is electrically connected to the lower contact arm 57. The top contact plate 62 and the bottom metallic plate 54 have ends that extend slightly beyond the edges of the arcuate section of the base 50 and these ends may be chamfered to promote good electrical contact with the helical spring 16, see Figure 2, when the device is assembled, ready for use.

It will be apparent the electrical circuit through the buzzer comprises the top plate 62 (or the bottom plate 54 and the stud 56), the upper contact arm 58, the contact points, the lower contact arm 57, the energizing coil 51, the terminal 68 and the screw 69. When a voltage is applied between the plate 62 and the screw 69 the coil becomes energized and the resulting magnetic flux attracts the contact arm 57, which is made of a magnetic steel, toward the coil. Downward movement of the upper contact arm is prevented by the adjusting screw 70 which is threaded through the core 52 and which passes through a clearance aperture in the lower contact arm. Consequently, the contact points separate thereby breaking the electrical circuit. The stiffness of the lower contact arm now causes the arm to move in a reverse direction toward its initial, at-rest, position. However, the inertia of the arm carries it past the normal, at-rest, position and in so doing it carries the upper arm 58 upward. During the movement of both contact arms the contact points are closed reestablishing the electrical circuit. By reason of the time constant of the inductive coil winding, the magnetic force does not reach its maximum magnitude instantly upon reestablishment of the electrical circuit. The time interval between the closing of the contact points (during upward motion of the contact arm) and the building up of the magnetic flux to an effective magnitude is sufficient to allow the resiliency of the contact arms to come into play and cause a reversal in the movement of both arms. As the contact arms again move toward the coil their motion will be accelerating by reason of the stiffness of the two contact arms tending to restore each arm to the normal, at rest, position, and the influence of the magnetic flux tending to attract the lower arm 57 toward the coil. Therefore, the contact arms are moving very rapidly at the instant when the upper arm strikes the end of the screw 79. Exceedingly rapid contact separation results, thereby limiting "contact arcing" time to a minimum period and prolonging the operating life of the electrical contacts. It will be noted the lower, soft-iron contact arm is relatively wide to provide a large area for effective attraction by the magnetic flux generated by the relatively small energizing coil. Further toward this end, the contact arm may be of increased thickness and provided with a transverse channel 76 intermediate the ends. In the latter case the vibration frequency of the arm is determined by the thickness of the arm in the channel area and the location of the channel from the free end of the arm. A buzzer made as herein described is of small size, measuring approximately 1″ x ½″ x ¾″, and will vibrate at a frequency of approximately 2,000 cycles per second with an operating current drain of 100 milliamperes from a 1½ volt flash-light battery. It will be noted the device is completely shielded.

When the buzzer is disposed within the probe housing, Figure 2, and the push-button 12 is depressed, the electrical circuit between the battery and the buzzer comprises the adjusting screw 33, flat-head screw 32, short shell 30, long shell 13, plug 17 and the helical spring 16. The force exerted by the helical spring normally maintains the push-button in the outwardly-extended position, as shown in Figure 1, in which position the shells 13, 30 are separated and the electrical circuit is open. Depressing the push-button establishes mechanical contact between adjacent edges of the shells thereby closing the electrical circuit and energizing the buzzer. As the shells 13, 30 are of equal diameter, physical contact between adjacent edges thereof establishes the limit of movement of the push-button. As explained above, the extent to which the button can be depressed is determined by the relative angular alinement between the complimentary, diagonally-sloped edges of the shells, as indicated by the alinement of the fiducial mark on the button with respect to the reference markings on the index ring 40. Such alinement, in turn, determines the electrical coupling between the tip 25 and the test prod 22.

Figure 13 is a simplified schematic circuit diagram of the device. When the electrical circuit is closed by pressing the push-button, a modified square wave appears across the energizing coil of the buzzer said wave having a harmonic content that extends into the megocycle region. Varying the position of the inner tip with respect to the outer prod by means of the indexing arrangement varies the coupling capacitance and allows some attenuation. The buzzer is connected directly to the prod in Position No. 1 and through the variable capacity coupling in Positions 2 through 10, the capacitance being the least in the number 10 position. The device is used to supply an input voltage signal to electronic amplifying circuits while observing the effect on the output voltage. When the sharp wave fronts of the signal voltage are applied to a tuned R. F. circuit, the circuit will transmit frequencies near its resonant frequency whereby the voltage applied to the tuned circuit constitutes a source of R. F. energy. The device also generates an audio voltage of approximately one (1) volt magnitude when the attenuator is placed in Position No. 1.

Some typical applications of the device are:

(1) to energize audio circuits for signal tracing purposes.

(2) to generate a signal in R. F. and A. F. tuned circuits for signal tracing purposes.

(3) to "ring out" cables and to check continuity of wiring with a telephone receiver as the signal pick-up.

(4) to measure audio amplifier gain.

(5) as a triggering device for multi-vibrator circuits.

Having now described, in detail, the illustrated embodiment of my invention, variations and modifications in the individual parts and the coacting arrangement thereof will suggest themselves to those skilled in the art, without constituting a departure from the spirit and scope of the invention as recited in the following claims.

I claim:

1. A probe type signal generator comprising a tubular housing, a test prod extending from one end of the housing, an electro-magnetic current interrupter disposed within the housing, a battery disposed within the housing, means connecting one terminal of the battery to one end of the coil of the interrupter, a metal tip carried by the interrupter and proximate to said prod, means connecting the said tip to the interrupter coil, a push-button movable axially within the other end of the housing, spring means normally biasing the push-button in a direction outwardly of the housing, cooperating means carried by the housing and the push-button and limiting the extent of the outward movement of the push-button, and conducting means effective upon inward movement of the push-button to complete the electrical circuit between the other terminal of the battery and the other end of the interrupter coil.

2. The invention as recited in claim 1, wherein the said conducting means includes a fixed metal shell spaced from and surrounding the battery and the interrupter, and a second metal shell carried by said push-button and axially spaced from said fixed shell.

3. The invention as recited in claim 2, wherein the two shells include diagonally-sloping, complimentary edges.

4. The invention as recited in claim 2, and including an adjustable member secured to the push-button said adjustable member establishing electrical contact between the said other terminal of the battery and the said second shell.

5. A portable signal generator comprising a tubular housing, a tapered head removably secured to one end of the housing, a test prod having an end extending outward from said head and an axial bore in the other end, a metal plug surrounding the said prod and insulated therefrom, a first metal shell within the housing and contacting the said plug, a push-button slidable axially within the other end of the housing, a second metal shell secured to the push-button and adapted to contact the fixed shell when the button is depressed, a battery having one terminal in electrical contact with the said second shell, a buzzer having a coil in electrical contact with the other terminal of the battery, a tip carried by the buzzer housing and electrically connected to the coil of the buzzer said tip extending into the bore in the said test prod, and a helical spring electrically connecting the said plug to the other side of the buzzer coil.

6. The invention as recited in claim 5, wherein the adjacent ends of the two metal shells include diagonally-sloping, complimentary edges.

7. The invention as recited in claim 5 and including means preventing rotation of the push-button when said push-button is depressed.

8. The invention as recited in claim 7, wherein the means preventing rotation of the push-button comprises longitudinally extending flutes in the surface of the push-button and a plurality of members depending from the housing wall and into the said flutes.

9. The invention as recited in claim 5, wherein the push-button has a circumferential groove at the inner end and including radially movable members extending through the housing wall and into the circumferential groove.

10. In a probe type signal generator of the type comprising a self-contained buzzer and battery, the combination comprising a finger-operable push button slidable within the probe housing, means actuated by the push button to close the electrical circuit between the battery and the buzzer, longitudinal flutes in the surface of the button, a circumferential groove at one end of the button said groove communicating with the said flutes, a metallic band around the probe housing, and a plurality of members carried by the said band and extending through apertures in the housing into contact with the said circumferential groove.

11. The invention as recited in claim 10, wherein the said band carries a series of reference indicia and the button carries a fiducial mark selectively alinable with the said reference indicia.

12. A signal generator comprising a tubular housing, a removable head carried at one end of the housing, a metal plug threaded into the head said plug having an axial bore extending therethrough, a test prod disposed within the bore of the plug and extending externally of the head, insulating members electrically insulating the prod from the plug, an axial bore in the inner end of the prod, a buzzer and a battery axially disposed within the housing, a helical spring disposed between the plug and the buzzer and tending to move said buzzer and battery away from the plug, a first metal shell surrounding the buzzer and a portion of the battery said shell contacting the said plug, a push-button axially movable within the other end of the housing, a second metal shell secured to the push-button and adapted to contact the first shell upon depression of the button, adjustable means establishing electrical contact between the battery and the second shell, longitudinal flutes in the surface of the button, a circumferential groove at one end of the button said groove communicating with the said flutes, a metal band around the tubular housing, radially extending members carried by the hand and extending through associated apertures in the housing wall said members riding in the circumferential groove in one positon of the button and in appropriate longitudinal flutes when the button is depressed, circuit elements completing the electrical circuit between the battery and the buzzer when the push-button is depressed, and a metal tip carried by the buzzer housing and electrically connected to the buzzer coil, said tip extending a predetermined distance into the axial bore of said test prod when the push-button is depressed.

13. The invention as recited in claim 12, wherein the metal band carries a series of reference indicia and the surface of the push-button carries a fiducial mark alinable with the said reference indicia.

14. An electromagnetic vibrator comprising a base of insulating material, an energizing coil carried by the base, a first contact arm of magnetic material axially spaced from the said coil and having an aperture therein, a second contact arm alined with the first contact arm, an adjustable member passing through the aperture in the first contact arm and engaging the surface of the second contact arm, and circuit elements including contact points on each contact arm for energizing the coil from a source of electrical energy.

15. The invention as recited in claim 14, wherein the circuit elements terminate at opposite ends of the insulating base.

16. The invention as recited in claim 14 and including a transverse channel extending across the first contact arm intermediate of the ends.

17. The invention as recited in claim 14, wherein the adjustable member displaces the second contact arm from its normal, at rest position.

WILLIAM A. YONKERS.

REFERENCES CITED

The following references are of record in the file of this patent:

UNITED STATES PATENTS

| Number | Name | Date |
|---|---|---|
| 772,944 | Kyle | Oct. 25, 1904 |
| 925,412 | Addie | June 15, 1909 |
| 2,142,304 | Cummings | Jan. 3, 1939 |
| 2,488,328 | Rider | Nov. 15, 1949 |